United States Patent [19]

Leong

[11] 4,367,988
[45] Jan. 11, 1983

[54] DUST GENERATOR

[75] Inventor: Basil K. J. Leong, Kalamazoo, Mich.

[73] Assignee: The Upjohn Company, Kalamazoo, Mich.

[21] Appl. No.: 195,224

[22] Filed: Oct. 8, 1980

[51] Int. Cl.³ ............................................. B65G 53/46
[52] U.S. Cl. ...................................... 406/63; 222/370
[58] Field of Search ....................... 406/63, 66, 67, 68, 406/64; 222/636, 370

[56] References Cited

U.S. PATENT DOCUMENTS

| | | | |
|---|---|---|---|
| 2,373,171 | 4/1945 | Daly | 222/325 X |
| 3,201,001 | 8/1965 | Roberts et al. | |
| 3,517,861 | 6/1970 | De La Vega | 406/63 |
| 3,909,068 | 9/1975 | Coucher | 406/63 |
| 4,092,046 | 5/1978 | Bombelli et al. | |
| 4,169,419 | 10/1979 | Burgess | |
| 4,177,941 | 12/1979 | Leong | |

OTHER PUBLICATIONS

Manufacturer's Specification Sheet for "NBS Dust Generator".
W. C. Hinds, "Dry-Dispersion Aerosol Generators" in *Generation of Aerosols and Facilities for Exposure Experiments*, pp. 179–181, Edited by Klaus Willeke, Ann Arbor Science Publishers Inc.

*Primary Examiner*—Jeffrey V. Nase
*Attorney, Agent, or Firm*—Flynn, Thiel, Boutell & Tanis

[57] ABSTRACT

In an apparatus for delivering selectable amounts of dust-laden gas, the base structure thereof includes support means having a substantially horizontal and circular recess in which is rotatably supported a circular disk having a plurality of transverse openings defining a circle coaxial with the disk. A cover partially covers the disk and has a dust container mounted thereon for selective communication with the transverse openings in the disk. The dust container and the circular recess define a substantially airtight chamber. A pair of coaxial openings are provided through the cover and support means for successive alignment with the transverse openings as the disk rotates and are in communication with a source of pressurized gas, whereby pressurized gas can be directed through a dust-laden transverse opening which is aligned with the coaxial openings. A leakage space is provided between the disk and cover so that when no transverse opening is aligned with the coaxial openings, the pressurized gas passes through the leakage space into the dust container.

5 Claims, 4 Drawing Figures

DUST GENERATOR

FIELD OF THE INVENTION

This invention relates in general to an apparatus for delivering a selectable amount of dust-laden gas from a container thereof, as to an animal inhalation exposure system. More particularly, said invention relates to a type of delivery apparatus including a source of gas under pressure connected to said container so that said gas intermittently delivers selected amounts of said dust from said container and, between such deliveries, escapes into the otherwise substantially airtight container in order to agitate the dust thereon.

BACKGROUND OF THE INVENTION

The apparatus disclosed in Applicant's U.S. Pat. No. 4,177,941 advanced the art over that in existence prior thereto. However, such apparatus was not completely satisfactory for Applicant's ultimate purposes. For example, the stirring means for agitating the dust in order to facilitate its movement into the openings in the metering disk is complex and is disposed in a chamber exposed to the ambient atmosphere. Accordingly, ambient air can be contaminated by the agitation of the dust, and transfer of the dust to the metering disk can be erratic. In addition, the driving motor is mounted above the metering disk so that lubricant for the motor and the interconnecting drive mechanism can contaminate the metering disk and the dust carried thereby. Further, the bearing beneath the dust chamber which supports the stirring means is exposed to the dust in the chamber, necessitating periodic cleaning to prevent jamming. Also, the changing of the metering disk in order to provide variations in the amount of dust being delivered involves a virtually complete disassembly of the apparatus.

Accordingly, a primary object of this invention has been the provision of a relatively simple dust generator or dust delivery apparatus having a dust containing hopper which is substantially airtight and the interior of which is periodically exposed to a pulse of gas under pressure which agitates the dust therein.

A further object of this invention is the provision of an apparatus, as aforesaid, to provide a mechanism which can be readily and quickly disassembled for the purpose of changing metering disks and which works well with both free-flowing and non-free-flowing powders.

A further object of the invention is the provision of an apparatus, as aforesaid, in which the bearings are not continuously exposed to the dust in the dust chamber and therefore need not be frequently cleaned to prevent jamming.

A further object of this invention is the provision of an apparatus, as aforesaid, wherein the entire driving mechanism is located below the metering disk to avoid any contamination thereof by lubricants and to simplify the changing of the gear train in order to effect variations in the rotational speed of the metering disk.

SUMMARY OF THE INVENTION

The objects and purposes of the invention, including those set forth above, are met by providing a base structure comprising support means having a substantially horizontal and circular recess in which is rotatably supported a circular plate means or disk having a plurality of transverse openings defining a circle coaxial with the disk. A cover partially encloses the disk and supports a dust hopper or container for communication with the transverse openings in the disk. The chamber defined by the dust hopper and the circular recess is substantially airtight. A pair of coaxial openings are provided through the cover and support means for successive alignment with the transverse openings as the disk rotates and are in communication with a source of pressurized gas, whereby the dust in the transverse openings is discharged. A leakage space is provided between the disk and the cover so that when no transverse opening is aligned with the coaxial openings, the pressurized gas passes through the leakage space into the dust hopper to agitate the dust therein.

Other objects and purposes of the invention will be apparent to persons acquainted with this subject matter upon reading the following specification and examining the accompanying drawings.

Figure 1:
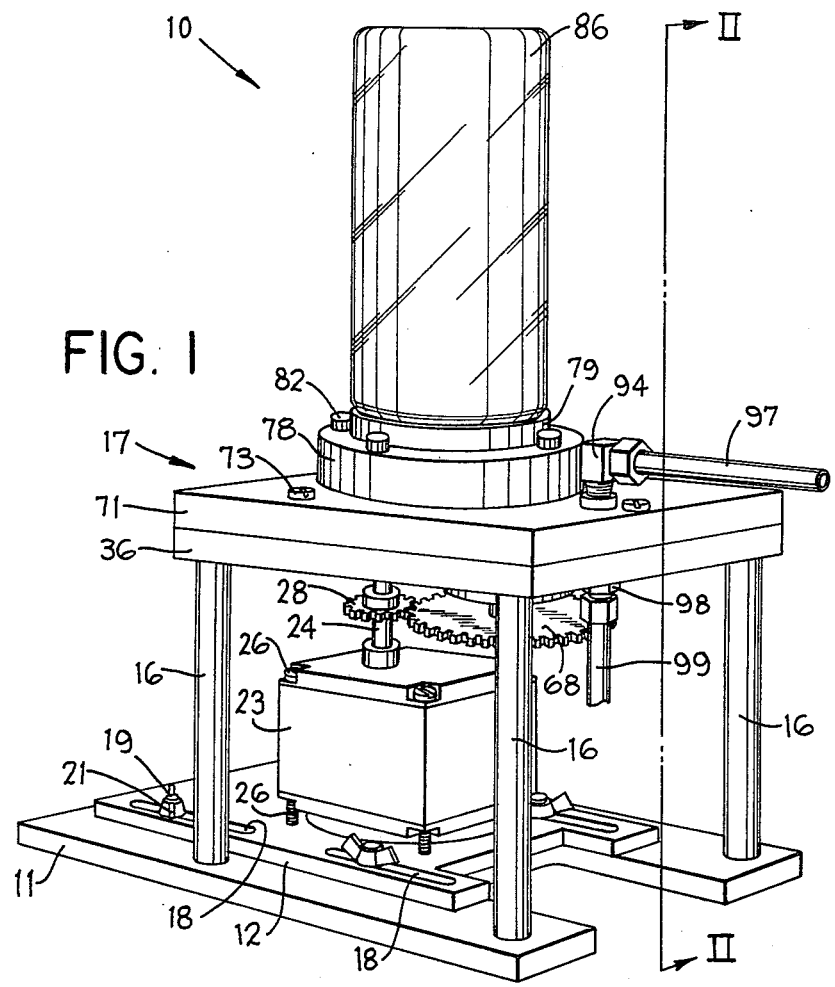
FIG. 1 is a perspective view of a dust generator embodying the invention.
Figure 3:
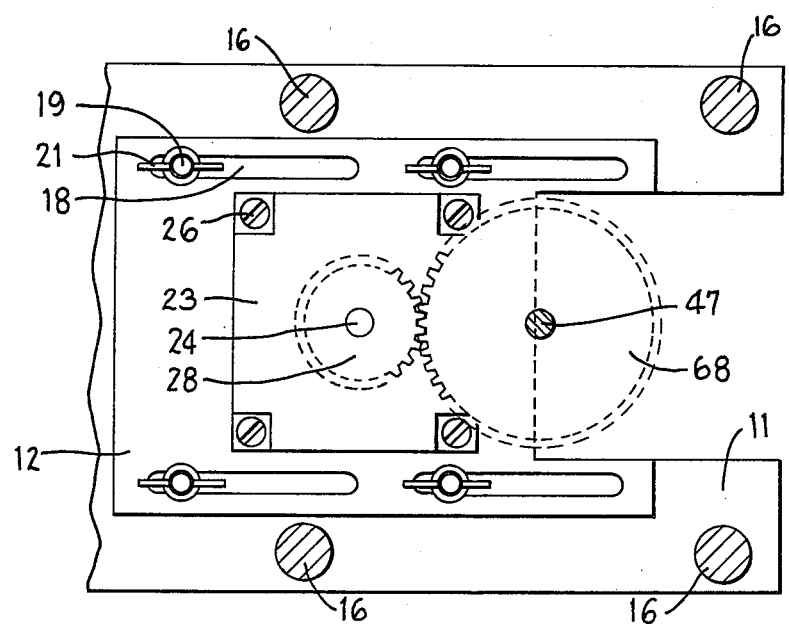
FIG. 3 is a sectional view taken along the line III-—III of FIG. 2.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include the words specifically mentioned, derivatives thereof, and words of similar import.

DETAILED DESCRIPTION

Figures 2, 4:
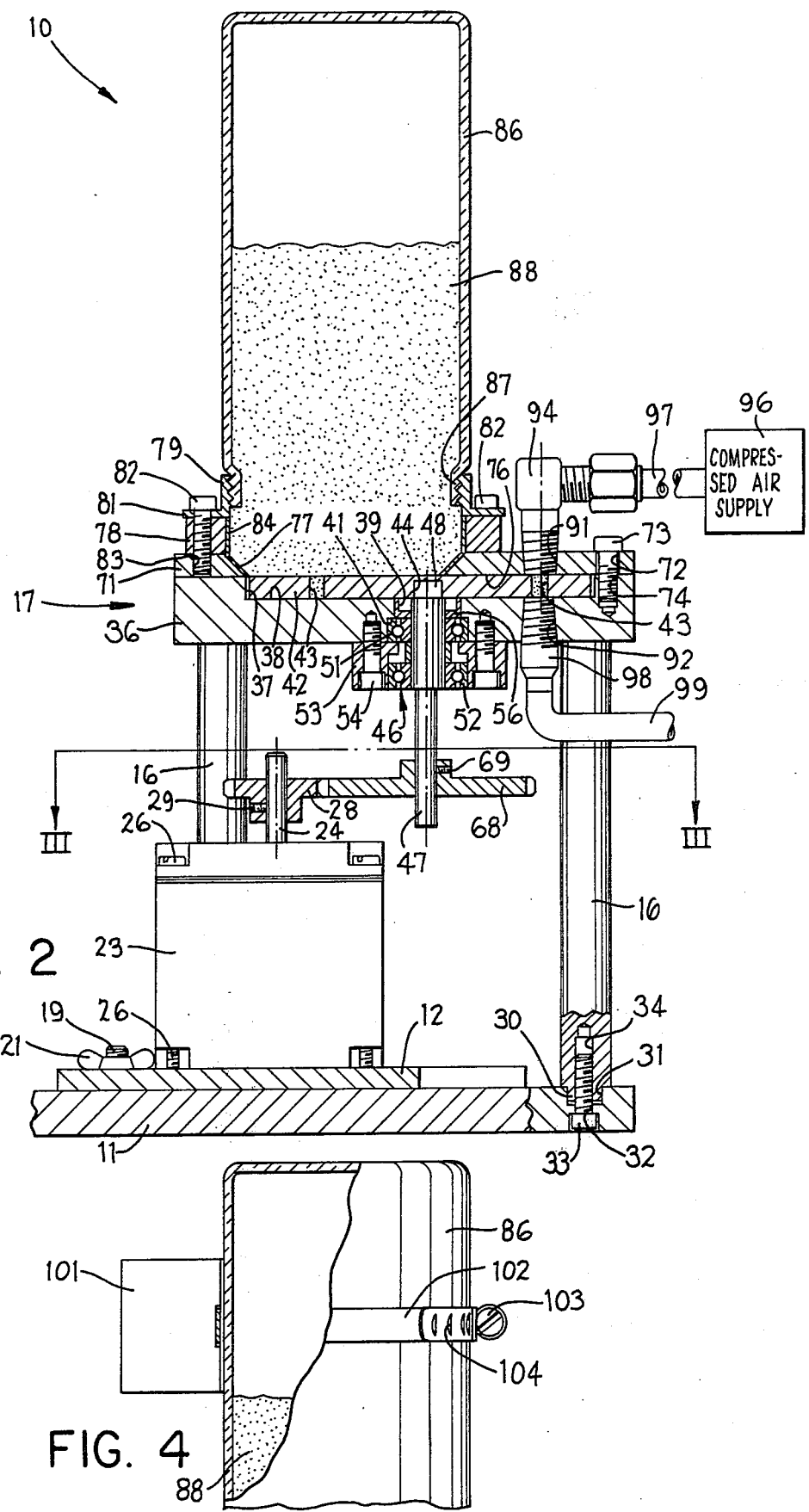
FIG. 2 is a broken, sectional view substantially as taken along the line II—II of FIG. 1.
FIG. 4 is a side view of a fragment of the dust generator of FIG. 1 showing an optional vibrator attached thereto.

FIGS. 1 and 2 illustrate a preferred embodiment of the dust generator 10 which includes a base plate 11 having a motor support plate 12 slidably mounted upon the upper surface thereof and having four vertical posts 16 supporting a dust delivery mechanism 17 above the base plate 11.

The motor support plate 12 has four guide slots 18 therein, all extending in the same direction. Four vertical studs 19 are rigidly mounted in the base plate 11, and each extends upwardly through a respective one of the slots 18 and has a wing nut 21 threadedly received on the upper end thereof. A motor 23 having a vertical drive shaft 24 is securely mounted to the top of the motor support plate 12 by bolts 26. A driving gear 28 is secured to the motor shaft 24 in any convenient manner, such as by a set screw 29.

Each vertical post 16 has a downwardly extending portion 30 which is snugly received into a recess 31 in the top surface of the base plate 11. A hole 32 which is coaxial with and of lesser diameter than the recess 31 extends downwardly through the base plate 11 from the recess 31. A bolt 33 extends upwardly through the hole 32 and is threadedly received within an internally threaded vertical bore provided in the lower end of the post 16. A similar arrangement, not illustrated, is utilized to secure the support plate 36 of the dust delivery mechanism 17 to the upper ends of the posts 16.

The support plate 36 has a circular recess 37 in the top surface thereof defining a substantially horizontal and upwardly facing, recessed surface 38. Said recess has a coaxial bore 39 therethrough which is of reduced diameter at its upper end, thereby defining a downwardly facing annular shoulder 41 within the bore 39.

A circular plate means or disk 42 having a diameter slightly less than the diameter of the recess 37, is disposed within the recess 37 with its undersurface resting on the upwardly facing surface 38. A plurality of spaced transverse holes 43 are provided through the disk 42 so that the center of each lies on a circle concentric with the circular disk 42. A square recess 44 is provided in the center of the undersurface of the disk 42.

A bearing assembly 46 is partially disposed in the lower portion of the vertical bore 39. The upper end 48 of the shaft 47 is square and is received within the square recess 44 in the circular disk 42 to effect rotation of the disk 42 by the shaft 47 when the shaft 47 is rotated in a manner described hereinafter.

The bearing assembly 46, which rotatably supports the shaft 47 upon the plate 36 and which may be of a conventional type, comprises a pair of vertically spaced bearings 51 and 52. The upper bearing 51 is received into the lower portion of the bore 39 and the bearing 52 is contained in the retainer ring 53, which is secured to plate 36 by means such as the bolts 54. A seal 56, which may be of a conventional type, surrounds the shaft 47 within the upper, reduced portion of the bore 39.

A driven gear 68 is provided on the lower end of the shaft 47 and is detachably affixed thereto in any convenient manner, as by a set screw 69. The gear 28 on the motor shaft 24 drivingly engages the gear 68 to effect rotation of the shaft 47 and the disk 42.

A cover plate 71 having a plurality of transverse holes 72 is mounted to the top of the support plate 36 by bolts 73 which extend through the holes 72 and are threadedly received within the internally threaded openings 74 in the support plate 36. The undersurface 76 of the cover plate 71 is substantially horizontal, and is disposed adjacent the top surface of the disk 42 so as to leave a small leakage space therebetween which is utilized in a manner described in detail hereinafter. A circular opening 77 is provided through the cover plate 71 above the disk 42 so that at least one hole 43 in the disk 42 is preferably exposed to the opening 77 in the cover 71 at any given time. An annular collar 78 is provided on top of the cover plate 71 concentric with the opening 77 through the cover plate 71. An internally threaded ring 79, having an outwardly extending flange 81 at its lower edge, is provided on top of and concentric with the collar 78. The threaded ring 79 and the collar 78 are mounted to the cover plate 71 by bolts 82 which extend through vertical openings in the flange 81 and collar 78 and are threadedly received in threaded holes 83 in the cover plate 71. If desired, a liner 84 can be provided on the radially inner surfaces of the collar 78 and the opening 77 in the cover plate 71.

An inverted cylindrical container 86 having an externally threaded neck 87 is threadedly engaged with and supported by the ring 79. The container or hopper 86 is filled with dust or a powdered material 88. The chamber defined by the hopper 86 and the circular recess 37 between the support plate 36 and the cover plate 71 is substantially airtight.

A pair of internally threaded and coaxially aligned openings 91 and 92 are respectively provided in the cover plate 71 and the support plate 36 such that, as the disk 42 is rotated, the holes 43 therein will be successively aligned between the openings 91 and 92. A pipe fitting 94 is threadedly engaged with the opening 91, and a compressed air supply 96 is connected to the fitting 94 through a supply conduit 97. A pipe fitting 98 is threadedly engaged with the opening 92 and is connected to a discharge conduit 99.

As shown in FIG. 4, an optional vibrator 101 may, if desired, be externally attached to the hopper 86 in any suitable manner, such as by a metal strap 102 which extends around the hopper 86 and has a tightening screw 103 mounted on one end thereof and threadedly engaging transverse slits 104 in the other end. The vibrator 101 may be of any conventional type, such as a conventional type which is powered by compressed air.

OPERATION

Although the operation of the mechanism described above will be generally understood from the foregoing description by persons skilled in the art, a summary of such operation is now given for convenience.

First, the hopper 86 must contain sufficient powder 88. Preferably, the hopper 86 is a glass bottle so that the amount of powder 88 in the hopper 86 can be ascertained by visual inspection. If insufficient powder 88 is present in the hopper 86, additional powdered material is added by inverting the dust generator 10, unscrewing the hopper 86 from the threaded ring 79, filling the hopper 86 with powder or substituting a hopper 86 already filled with powder, screwing the hopper 86 back into the threaded ring 79, and then returning the dust generator 10 to the upright position illustrated in FIG. 1.

Depending on the characteristics of the particular powdered material 88 placed in the hopper 86 and the quantity thereof which is to be delivered through the discharge hose 99, an appropriate rotational speed for the disk 42 must be selected and gears 28 and 68 which have the proper ratio to implement that speed must be installed in the dust generator 10. A change of either or both gears 28 and 68, when necessary, is effected by loosening the four wing nuts 21 and sliding the support plate 12 on the surface of the base plate 11 in a direction parallel to the guide slots 18 in the support plate 12 so that the gears 28 and 68 are moved apart. The set screws 29 and 69 respectively provided in the gears 28 and 68 can then be loosened, the gears 28 and 68 removed from their respective shafts, substitute gears having the desired drive ratio placed on the respective shafts, the set screws in the gears tightened, the support plate 12 slidably moved toward its original position until the teeth of the gears are engaged, and the wing nuts 21 tightened again.

The dust generator 10 is started by activating the compressed air supply 96 and supplying power to the motor 23. The motor shaft 24 then rotationally drives the shaft 47 through the gears 28 and 68, and the square upper end 48 of the shaft 47 cooperates with the square recess 44 in the disk 42 to rotationally drive the disk 42 within the recess 37 in the support plate 36. As the disk 42 is rotated, the transverse holes 43 in the disk 42 are successively rotated past the opening 77 and are filled as described hereinafter with powder 88 from the hopper 86. As the disk 42 continues to rotate, the holes 43 filled with powder 88 are successively aligned between the openings 91 and 92, respectively, provided in the cover plate 71 and support plate 36, and the compressed air supplied to the opening 91 by the compressed air supply 96 discharges the powder 88 from the holes 43 through the opening 92 into the discharge hose 99.

During the brief intervals of time when no hole 43 is aligned with the openings 91 and 92, a portion of the disk 42 will be disposed between the openings 91 and 92 and will divert compressed air supplied to the opening 91 by the compressed air supply 96 across the circular recess 37 through the leakage space between the top of the disk 42 and the undersurface 76 of the cover 71 and into the hopper 86 through the opening 77 in the cover 71. Since this diversion of compressed air from the opening 91 to the hopper 86 will occur only when no hole 43 is aligned between the openings 91 and 92, the compressed air is diverted into the hopper 86 in a pulsating manner, effecting agitation and aeration of the powder 88 in the hopper 86 and pressurization of the hopper 86. The agitation and aeration of the powder 88 keeps the powder 88 flowing freely, so that gravity and the pressure in the hopper 86 cooperate to facilitate dependable and complete filling of each hole 43 in the plate 42 with the powder 88. The pressure in the hopper 86 is not permitted to rise to a level sufficient to inhibit the pulsating effect, because pressure is continually and intermittently reduced as the holes 43 rotate past the opening 92. The seal 56 prevents the air pressure within the chamber defined by the hopper 86 and circular recess 37 from carrying powder 88 into the bearing assembly 46 and causing the bearing assembly 46 to jam.

If desired, the vibrator 101 (FIG. 4) can be externally mounted on the hopper 86 to vibrate the hopper 86 and the powder 88 therein to further facilitate the gradual downward movement of the powder 88 within the hopper 86 as the holes 43 in the disk 42 remove powder from the lower end of the hopper 86. It will be recognized, however, that the vibrator 101 is not essential to the effective operation of the dust generator 10.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for delivering a selected amount of dust-contaminated gas comprising:

a base structure having support means with a substantially horizontal support surface;

plate means supported upon said surface for rotation about a central axis perpendicular to said surface, said plate means having a plurality of transverse openings arranged in a circle concentric with said central axis;

cover means secured to said support means for enclosing a substantial portion of said plate means;

means defining a hopper opening through said cover means arranged for communication with said transverse openings in said plate means;

hopper means mounted upon said cover means and communicating with said hopper opening to define with said cover means and said support means an airtight dust chamber;

drive means mounted upon said support means and connected to said plate means for rotating same;

substantially coaxial openings through said support means and said cover means arranged for successive alignment with each of said transverse openings as said plate means is rotated, said coaxial opening in said cover means being connected to a source of gas under pressure;

a leakage space provided between said plate means and said cover means extending laterally from said coaxial opening in said cover means to the bottom of said hopper means for passing the gas from said cover means into said hopper means when said coaxial openings are not aligned with any of said transverse openings in said plate means so as to agitate the dust in said hopper means, said central axis of said plate means being offset from the center of said hopper opening laterally towards said substantial coaxial openings in said support means and cover means, said central axis of said plate means still lying laterally within the perimeter of said hopper opening, such that said leakage space extends substantially the full radial distance on said rotatable plate means from said concentric circle substantially to said central axis.

2. An apparatus according to claim 1, wherein said drive means is disposed below said support means and includes depending shaft means drivingly connected to said plate means; and a bearing assembly rotatably supporting said shaft means on said support means.

3. An apparatus according to claim 2, wherein said drive means includes a motor having an upstanding shaft, said base structure including a base plate, a motor support plate slidable upon said base plate and spaced below said support means, said motor being fixed atop said slidable motor support plate, said motor shaft and shaft means defining a common plane and being laterally spaced and parallel, a pair of gears, one mounted upon the shaft of said motor and the other mounted upon said shaft means, interengaged guide means on said motor support plate and base plate aimed in said common plane along a line perpendicular to said shaft and shaft means until the gear on said motor shaft engages the gear on said depending shaft means, and means for locking said guide means to maintain engagement of said gears.

4. An apparatus according to claim 1, wherein said hopper means is an inverted cylindrical container having a threaded neck at its open end, said cover means comprising a plate, said hopper opening in said cover plate being funnel shaped, a separate internally threaded ring fixed atop said cover plate at the upper edge of said funnel shaped opening and threadedly engageable with the neck of the container.

5. An apparatus according to claim 4, including vibrator means operably connected to said hopper means for vibrating same.

* * * * *